United States Patent Office 3,112,981
Patented Dec. 3, 1963

3,112,981
PROCESS FOR IMPROVING DYEABILITY OF SYNTHETIC MATERIALS OBTAINED BY POLYMERIZING MONOOLEFINIC HYDROCARBONS
Corrado Fuertes, Enrico Ferraris, and Amerigo Wildermuth, Milan, Italy, assignors to Aziende Colori Nazionali Affini ACNA, S.p.A., Milan, Italy, a corporation of Italy
No Drawing. Filed May 4, 1960, Ser. No. 26,720
Claims priority, application Italy May 8, 1959
23 Claims. (Cl. 8—4)

The present invention relates to a process for the direct dyeing of a synthetic material obtained by the polymerization of an olefin hydrocarbon such as propylene, ethylene, etc., such synthetic materials being capable of being worked to obtain textile fibres, films, or other articles.

Heretofore, it has been virtually impossible to satisfactorily dye articles made from olefin hydrocarbon polymers such as polyethylene and polypropylene, largely because the particular polymeric structure is made up of only carbon and hydrogen atoms and is therefore free of polar or reactive atoms or radicals. Accordingly, such polymers are not suitable for forming adequate bonds of a physico-chemical nature with the various dyes known in the literature.

Further, the use of "plastosoluble" dyes (by a plastosoluble dye it's meant a dye having some affinity for plastic materials) which, under certain conditions can be "dissolved" in materials not containing reactive groups such as, e.g., polyethylene and polypropylene, has not produced satisfactory results because the solution of dye-in-polymer obtained has exhibited completely negative or very poor fastness.

It is therefore an object of this invention to provide an improved method of dyeing, using basic or plastosoluble dyes, a synthetic material obtained by polymerizing a monoolefinic hydrocarbon and of rendering the latter dye-receptive. Additional objects will become apparent hereinafter.

We have found that when the olefin hydrocarbon polymer is initially treated first with an aliphatic amine and then with an aqueous solution of an acid, the hydrocarbon acquires as a result of these treatments a high dyeability, particularly with basic plastosoluble dyes.

Preferably the aliphatic amine should have a chain consisting of at least 4 carbon atoms. A mixture of such amines may also be used. Typical aliphatic amines that are suitable for use in our invention, either alone or in admixture with one another, include butyl amine, octyl amine, lauryl amine, oleyl amine, stearyl amine, and as well as stearyl-, palmityl- and oleyl diamine (having the following formulas: $NH_2$—$(CH_2)_{18}$—$NH_2$, $NH_2(CH_2)_{16}NH_2$

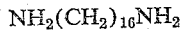
and $NH_2$—$C_8H_7$—$CH=CH$—$(CH_2)_8$—$NH_2$.

The process of our invention is preferably carried out by spinning a molten mixture of the polymer with one or more amines (the mixture having been obtained either (1) by mixing the powdered polymers and the amine and then melting the mixture, or (2) by first melting the polymer and then adding the desired amount of amine thereto and then homogenizing the mixture whole) and then treating the resulting yarn with an aqueous solution of an acid, this entire treatment being carried out before the dyeing step.

The proporton of amine or amines present with respect to the polymer may vary over a wide range depending on the result desired. Generally, a suitable range is from about 0.2 to 5% of amine. a preferred range is from about 1 to 2% of amine.

Suitable stabilizers, antioxidants, etc., may be added as desired to the thus-prepared mixture before spinning.

According to an alternative method of our invention, the polymer may first be spun and the resulting yarn be immersed first into an aqueous suspension of one or more aliphatic amines and then into an aqueous solution of an acid.

The aqueous amine suspension can be prepared by either using suitable dispersing agents or simply by means of vigorous and effective agitation, preferably at a temperature at which the amine is liquid. The duration of the treatment of the fibre with this suspension will depend upon the form of the fibres (e.g. whether staple, reels, tops, fabric, etc.). The amine suspension should have a concentration of from about 0.1 to 5 weight percent. A preferred concentration is from about 0.5 to 1.5 weight percent. The treatment is desirably carried out at a temperature of from about 50 to 95° C.

After this treatment the fibre is removed from the bath, and is subjected to centrifugation or to another type of squeezing operation. The fibre is then immersed for about 30 minutes into an aqueous solution of an acid having a concentration of between about 1 and 20 weight percent. Desirably the acid solution is warm, of the order of 80° to 120° C.

The nature of the acid to be employed in the bath will depend upon the kind of the dye employed. In general, best results are usually obtained with inorganic acid, such as hydrochloric or nitric acid.

After removal from the acid bath the fibre is rinsed with lukewarm or cold water and then dyed by any of the usual dyeing methods with either basic or cetyl dyes (in the latter case, preferably in the dispersed form).

The resultant fibre will maintain its newly acquired dyeability even after drying and storage.

Surprisingly, we found that treatment of the fibre with either the amine or with the acid alone resulted in a fibre having very poor dyeability characteristics. Equally surprising is the fact that when the sequence of treatment is reversed, i.e., first treating the fibre with acid and then with the amine, the dyeability characteristics of the resultant fibre are unsatisfactory.

Finally, treatment with a solution of an amine salt does not impart satisfactory dyeability to the fibre.

The following examples will further illustrate our invention. All parts are by weight unless otherwise indicated.

*Example 1*

With the aid of a dispersing agent (consisting of the condensation product of 1 mole oleic alcohol with 18–20 moles ethylene-oxide) a 1% aqueous lauryl amine dispersion is prepared. This dispersion is heated to from about 80–90° C. A polypropylene staple having a M.W. of about 90,000 is immersed therein (bath ratio i.e., polypropylene:bath 1:20) and kept completely immersed while agitating for 30 minutes. The staple is then removed and immersed into a bath (bath ratio 1:20) consisting of a 10% hydrochloric acid solution maintained at from about 80–90° C. The staple is kept completely immersed while agitating for about half an hour. It is then removed from the bath and rinsed with cold water until no longer acid and is then dyed in the usual manner using Brilliant Green crystals GX (Color Index 42000). Brilliant and intense green shades are obtained which exhibit a good general fastness.

*Example 1A*

Instead of immersing the polypropylene in an aqueous dispersion of lauryl amine as described in Example 1, a polypropylene polymer is melted along with 2% lauryl amine and the molten mass is then spun. The fibres obtained are then immersed in a bath of a 10% hydrochloric acid solution at about 80–90° C. After washing, the polymer fibre is dyed with Brilliant Green crystals GX. Very intense and fast shades are obtained.

*Example 2*

With the aid of a dispersing agent (consisting of the condensation product of 1 mole castor oil with 40–42 moles of ethylene oxide) a 1% aqueous oleyl amine dispersion is prepared. A solid polypropylene staple is immersed (bath ratio 1:20) and maintained therein under agitation for half an hour at about 80–90° C. The staple is then immersed in another bath (bath ratio 1:20) consisting of a 10% hydrochloric acid solution in which it is agitated for half an hour at 80–90° C. The staple is then washed with cold water until it presents a neutral reaction and is then "warm dyed" with an Auramine O solution (C.I. 41000). An intense and solid shade is thus obtained.

*Example 3*

With the dispersant described in Example 1, a 1% stearyl amine dispersion is prepared. A polypropylene staple is immersed therein for half an hour at about 80–90° C. with continuous agitation. It is then passed into the acid bath described in Example 1, rinsed, and dyed with finely dispersed Microsetile Scarlet B (C.I. 1110). The red shade produced on the fibre is intense, brilliant and exhibits good fastness.

*Example 3A*

Instead of immersing the polypropylene staple into a 1% stearyl amine dispersion as in Example 3, the polypropylene is melted with 2% stearyl amine and the molten mass is spun. The resulting fibre is immersed in a 10% hydrochloric acid bath at 80–90° C. for about half an hour, water washed until neutral, and dyed with finely dispersed Microsetile Scarlet B (C.I. 1110). An intense, brilliant red shade having excellent fastness characteristics is produced.

*Example 4*

A polypropylene mass containing 2% oleyl amine is melted, homogenized and spun. The resulting fibre is treated with a 10% nitric acid solution for half an hour at about 80–90° C. (bath ratio 1:20). The fibre is then washed with cold water until it presents a neutral reaction, and is then dyed with Rodamine B (C.I. 45170). The pink shade produced on the fibre is intense and brilliant and exhibits good general fastness.

*Example 5*

Into an aqueous bath containing 1% lauryl amine dispersed by means of vigorous agitation, a polypropylene staple is introduced and maintained therein for half an hour at 80–90° C. (bath ratio 1:20). The staple is then subjected to acid treatment as described in Example 1 and to subsequent washing. The resulting staple is readily dyed with finely dispersed Setile Pink BN (C.I. 60710), to produce a brilliant pink shade having good general fastness.

*Example 6*

Into a dispersion containing 0.5% stearyl amine and 0.5% oleyl amine, this dispersion having been prepared with the dispersant obtained by the condensation of 1 mole of nonylphenol with 10 moles of ethylene oxide, a polypropylene staple is introduced and maintained therein under agitation for about 30 minutes. The staple is then treated with a 10% nitric acid solution for about 30 minutes at about 80–90° C. (bath ratio 1:20). The staple is then water washed as described in Example 1. The thus treated staple exhibits good affinity for Methyl Violet N (C.I. 42535), and intense solid shades are obtained.

*Example 7*

A solid polypropylene staple is immersed in an aqueous bath containing 1% n-butylamine and maintained therein for half an hour at 50° C. under agitation. The staple is then passed into an acid bath as described in Example 1, rinsed, and dyed with finely dispersed Microsctile Orange GR (C.I. 11005). The resulting staple is dyed an intense shade having good fastness.

*Example 7A*

Instead of immersing the solid polypropylene staple into an aqueous bath of butyl amine as described in Example 7, a mass consisting of polypropylene with 2% stearyl-oleyl-palmityl diamines (a mixture of the 3 diamines) is melted and the molten mass is then spun. The silky fibre obtained is immersed into a 10% hydrochloric acid bath at 80–90° C. for about 30 minutes, washed with water until no longer acidic, and then dyed with Microsetile Orange GR (C.I. 11005). An intense fast shade results.

*Example 8*

Using the dispersant described in Example 2, a 1% n-octyl-amine dispersion is prepared. A polypropylene staple is immersed therein for half an hour at 80–90° C. under agitation. Acid treatment (using nitric acid) is carried out in the usual manner, followed by water washing until neutral. The resulting material acquires good affinity for Auramine O dye (C.I. 41000), with which brilliant solid shades are obtained.

*Example 9*

A 1% dispersion of stearyl-oleyl-palmityl diamines is prepared with the dispersant of Example 1, heated to 80–90° C., and a polypropylene staple is immersed therein (bath ratio 1:20) for one hour under agitation. The polypropylene is then subjected to acid treatment and to washing as described in Example 1. It is then dyed with finely dispersed Microsetile Yellow 5 G (C.I. 12790). The yellow shade produced on this fibre is intense, brilliant and has a good general fastness.

Polyethylene fibres may be dyed as well according to the method described in the foregoing examples.

Variations can, of course, be made without departing from the spirit of our invention.

Having thus described our invention, what we desire to secure and claim by Letters Patent is:

1. A method of rendering dye-receptive a synthetic material obtained by polymerizing a monoolefinic hydrocarbon, this method comprising treating the synthetic material, prior to dyeing, first with an aliphatic amine containing from 4 to 18 carbon atoms in its main chain and then with a dilute aqueous solution of an acid.

2. The method of claim 1 wherein polypropylene is the synthetic material.

3. The method of claim 1 wherein the amine is butylamine.

4. The method of claim 1 wherein the amine is octyl amine.

5. The method of claim 1 wherein the amine is stearyl amine.

6. The method of claim 1 wherein the amine is lauryl amine.

7. The method of claim 1 wherein the amine is oleyl amine.

8. The method of claim 1 wherein the acid is selected from the group consisting of hydrochloric acid and nitric acid.

9. The method of claim 1 wherein the acid solution has a concentration of from about 1% to 20%.

10. The method of claim 1 wherein the acid solution is maintained at a temperature of from about 80° C. to 90° C.

11. The method of claim 1, wherein the acid is inorganic.

12. The method of claim 1 wherein the synthetic material and amine are mixed and then are immersed into an acid bath.

13. The method of claim 12 wherein a mixture is obtained by first melting the powdered polymer of synthetic material separately, then adding the amine, and homogenizing the resulting mixture.

14. The method of claim 12 wherein a mixture is obtained by mixing the polymer of synthetic material with the amine and then melting the resulting mixture.

15. The method of claim 12 wherein the amine comprises from about 0.2 to 5 percent by weight of the polymer.

16. The method of claim 12 wherein the amine comprises from about 1 to 2 percent by weight of the polymer.

17. The method of claim 1 wherein the polymer of synthetic material is spun and the fibres so obtained are first immersed into an aqueous amine suspension and then into an acid solution.

18. The method of claim 17 wherein the suspension has an amine concentration of from about 0.1% to 5%.

19. The method of claim 17 wherein the suspension has an amine concentration of from about 0.5 to 1.5 percent.

20. The method of claim 17 wherein the amine suspension in which the fibre is immersed is kept at from about 50° C. to 95° C.

21. The method of claim 1 wherein a mixture of amines is used.

22. The method of claim 21 wherein the amine mixture comprises a mixture of stearyl, oleyl and palmityl diamines.

23. The method of claim 21 wherein the amine mixture comprises oleyl amine and stearyl amine.

References Cited in the file of this patent

UNITED STATES PATENTS

| | | |
|---|---|---|
| 2,675,360 | Caldwell | Apr. 13, 1954 |
| 2,886,471 | Bruce et al. | May 12, 1959 |
| 2,899,262 | Stanton et al. | Aug. 11, 1959 |
| 2,899,408 | Caldwell et al. | Aug. 11, 1959 |
| 2,914,373 | Rieser | Nov. 24, 1959 |
| 2,925,404 | Caldwell et al. | Feb. 16, 1960 |
| 2,937,066 | Walles | May 17, 1960 |
| 2,973,241 | Scott | Feb. 28, 1961 |

FOREIGN PATENTS

| | | |
|---|---|---|
| 613,817 | Great Britain | Dec. 3, 1948 |
| 719,087 | Great Britain | Nov. 24, 1954 |